United States Patent

[11] 3,614,607

| | | |
|---|---|---|
| [72] | Inventor | Kurt Schoen |
| | | Zurich, Switzerland |
| [21] | Appl. No. | 807,853 |
| [22] | Filed | Mar. 17, 1969 |
| [45] | Patented | Oct. 19, 1971 |
| [73] | Assignee | Contraves AG |
| | | Zurich, Switzerland |
| [32] | Priority | Apr. 5, 1968 |
| [33] | | Switzerland |
| [31] | | 5140/68 |

[54] PARTICLE COUNTING APPARATUS
16 Claims, 5 Drawing Figs.

[52] U.S. Cl. ........................................... 324/71 CP,
324/65 R
[51] Int. Cl. .......................................... G01n 27/00,
G01r 27/02
[50] Field of Search ..................................... 324/71, 71
CP, 65, 65 P

[56] References Cited
UNITED STATES PATENTS

| 2,985,830 | 5/1961 | Coulter et al. | 324/71 |
| 3,165,692 | 1/1965 | Isreeli et al. | 324/71 |

FOREIGN PATENTS

| 1,152,100 | 9/1957 | France | 324/71 |

OTHER REFERENCES

Kubitschek, H. E.; "Apertures for Coulter Counters;" The Review of Scientific Instruments; Vol. 35; No. 11; Nov. 1964; pages 1598, 1599; copy in 324–71.

*Primary Examiner*—Rudolph V. Rolinec
*Assistant Examiner*—Ernest F. Karlsen
*Attorney*—Jacobi & Davidson ABSTRACT: There is disclosed an apparatus for counting particles suspended in a fluid medium the electrical conductivity of which is different from that of the particles. A quantity of this fluid medium containing the suspended particles is delivered by a conveying system from a container or the like through an electrical resistance measuring path. Each particle upon passing through the electrical resistance measuring path causes a change in the resistance of such measuring path which is dependent upon the size of the particles. According to an important aspect of the invention, an electrode support means is mounted in sealing fashion upon or at an exchangeable measuring tube and there is exchangeably mounted at such electrode support means a measurement path support member providing at least one such electrical resistance measuring path.

INVENTOR
Kurt Schoen
BY Jacobi & Davidson
ATTORNEYS

PARTICLE COUNTING APPARATUS

BACKGROUND OF THE INVENTION

The present invention relates to a new and improved counting apparatus for counting particles suspended in a fluid medium the conductivity of which differs from that of the particles. Generally speaking, the particle counting apparatus of the present invention is of the type wherein a respective quantity of fluid medium with the suspended particles measured in a volume metering device is conveyed by means of a conveyor or transport system from a container or the like through an electrical resistance measuring path. Each particle upon passing through the electrical resistance measuring path causes a change in the measuring path resistance which is dependent upon the size of the particles.

Those acquainted with the prior art constructions are aware of systems which count particles suspended in a fluid, the particles possessing an electrical conductivity different from that of the fluid, by means of a change of the electrical resistance effected at an electrical resistance measuring path. These known particle counters utilize for the measuring path- and electrode-support glass vessels or containers equipped with a calibrated bore constructed as the resistance measuring path. It has likewise already been proposed in the art to use for the calibrated resistance measuring path a capillary tube bored in a crystal set into a bore of the glass vessel. The manufacture of the measuring path support is expensive. As such is generally required for glass articles which are readily subject to breakage, the thus constructed measuring path support must be frequently replaced.

SUMMARY OF THE INVENTION

Accordingly, it is a primary object of the present invention to provide an improved particle counting apparatus which effectively overcomes the drawbacks of the aforementioned prior art constructions.

Still, another more specific object of the present invention relates to the provision of an improved particle counting apparatus which is relatively simple in construction, reasonably inexpensive to manufacture, not readily subject to malfunction or breakdown, and provides for extremely accurate determination of the particle concentration in a fluid medium.

Yet a further very significant object of the present invention relates to an improved particle counting apparatus which possesses a construction enabling the ready and rapid replacement or exchange, in quite simple fashion, of the means providing at least one predetermined electrical resistance measuring path for a different one.

Now, in order to implement these and still further objects of the invention, which will become more readily apparent as the description proceeds, the invention contemplates the provision of a new and improved particle counting apparatus manifested by the features that, an electrode-support means is tightly seated upon or at a measuring tube means and there is exchangeably mounted at such electrode support means a measuring path support member equipped with at least one predetermined electrical resistance measuring path. For instance, the measuring tube means can be constituted by a calibrated glass tube. Moreover, there is a wide range of choice as to the material for forming the measuring path and electrode supports, and depending upon the intended use such can be, for instance, formed of ceramic, or plastic, such as Teflon. According to the proposed embodiments of the invention the exchangeable measuring path support member, which is quite inexpensive to produce, renders possible for a single electrode-support means the fabrication of a complete array of different appropriately fitting and correspondingly identified or designated measuring path support members which carry resistance measuring paths of different size or dimensions.

The invention further contemplates that there be provided a measuring path support member which carries a number of measuring paths of the same or different size. These measuring paths can be conveniently placed into their working or operable position by undertaking an appropriate movement of the measuring path support member.

It has been found that with particle counting devices for counting small particles, typically for instance blood cells, the resistance measuring path oftentimes becomes clogged due to the presence of contaminants. This danger that sucked up dust particles or other foreign bodies will clog the resistance measuring path is especially great with counting devices having a continuously operating suction pump where it is necessary to aerate or vent the volume metering device prior to performing each new counting operation. However, with the teachings of the present invention it will not be necessary to replace the measuring path support member upon the occurrence of each disturbance. Quite to the contrary, the inventive construction only requires the displacement of a different resistance measuring path of the same measuring path support member into its working position. Furthermore, between the resistance measuring path and the volume metering device there is advantageously provided a gas inlet means which permits venting of the volume metering device. Due to this measure, the resistance measuring path is no longer adversely influenced in the event that dust particles or other contaminants are sucked in. This gas inlet means or a number thereof, can be provided at the measuring path support member proper. Especially suitable for the volume metering device is an optical-electrical system. If the measuring tube, which is removably mounted to the base of the counting apparatus or within the optical-electrical system in combination with the hose that leads to the pump, together with the thereon sealingly or tightly mounted measuring head embodying the electrode-support means and measuring path support member is slightly inclined towards the side of the pump, then advantageously the measuring head is not immersed in the vessel or container housing the fluid medium which is to be analyzed. The fluid medium is then, for instance, sucked up by means of a hose secured to the measuring head. This arrangement enables simple exchange of the container or vessel housing the fluid medium sample.

DESCRIPTION OF THE DRAWINGS

The invention will be better understood, and objects other than those set forth above, will become apparent when consideration is given to the following detailed description thereof. Such description makes reference to the annexed drawings wherein the same or substantially the same reference characters have been conveniently used throughout to designate like or analogous components, and wherein.

DESCRIPTION OF THE PREFERRED EMBODIMENTS

Figure 1:
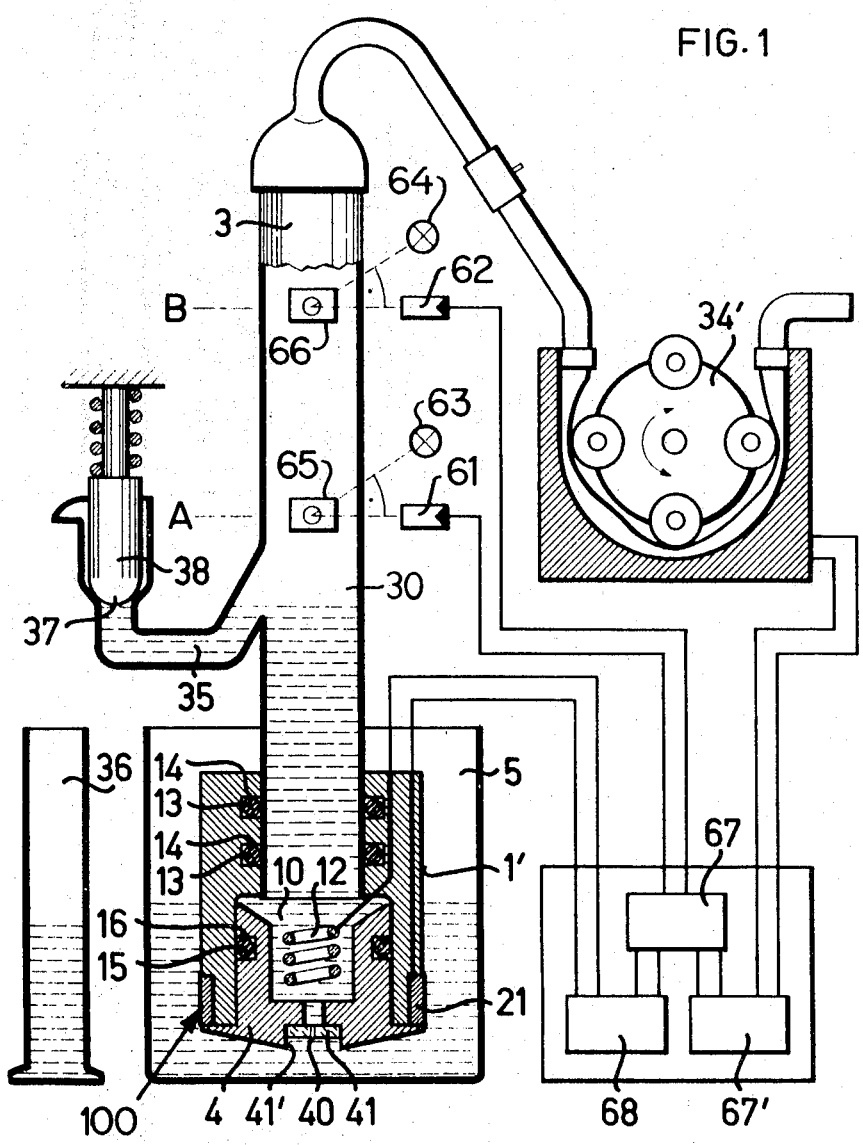
FIG. 1 schematically illustrates in sectional view a preferred embodiment of inventive particle counting apparatus.

Describing now the drawings, in FIG. 1 there is shown, by way of illustration and not limitation, a first embodiment of inventive particle counting apparatus incorporating a measuring head 100 embodying an electrode-support member 1' at which there are molded or otherwise fixedly arranged in a groove the substantially annular or ring-shaped outer electrode 21 and in a bore 10 the substantially spiral-shaped inner electrode 12. The outer electrode 21 and the inner electrode 12 are, for instance, formed of platinum or a platinum alloy. A pair of circumferential grooves 14 are provided at the wall of the bore 10, and such grooves serve to receive both of the sealing O-rings 13.

Measuring head 100 further consists of a measuring path support member or carrier 4 exchangeably fitted into the bore 10 of the electrode support 1'. Circumferential groove means 16 formed at the outer surface of this measuring path support member 4 receive the sealing O-ring means 15. Additionally, it will be understood that in the bore of the measuring path support member 4 there is fitted a substantially disklike crystal, such as the ruby 41 having a bore 40 and providing a calibrated electrical resistance measuring path. In order to count different size particles it is possible to simply replace the measuring path support member 4. This measuring path support member 4 and the electrode support 1' are advantageously formed of an extensively chemically inert material, such as Teflon or ceramic, for instance.

Continuing, it will be observed that a measuring tube means, here shown in the form of a glass tube 3 is provided with a throughflow passage 30 is inserted by one end into the widened portion of the bore 10 of the electrode support 1'. During operation, a pump unit, here for instance depicted as a hose pump 34' conveys fluid medium with suspended particles from a supply container or vessel 5 through the bore or orifice 40 into the glass tube 3. As soon as the fluid column has passed through the level A, then a counter mechanism 68 is switched in through the action of a control device 67 which, for instance, utilizes a photocell 61 as its signal transmitter. Light from the light source 63 passes through the stop or diaphragm 65 onto such photocell 61. The counter mechanism 68 then proceeds to count the particles flowing through the bore 40 of the ruby 41 providing the measuring path. A second signal transmitter 62, likewise impinged by a bundle of light rays emanating from the light source 64 and passing through the stop or diaphragm 66, switches off the counter mechanism 68 as soon as the fluid column has passed through the level B. At the same time a suitable switching device 67' changes the direction of rotation of the pump unit 34' and therefore its action. The fluid medium located internally of the glass tube 3 is then ejected through the discharge tube or pipe portion 35, flowing into the collecting container or vessel 36. The entire counting operation can be automated. At this point it should be mentioned that details of the electronic circuitry incorporating the control device 67', the counter mechanism 68 and the switching device 67' are not necessary for understanding the inventive concepts herein disclosed. Still, for a more complete understanding of the automated counting aspects of the overall system reference may be readily had to the commonly assigned, copending U.S. application, Ser. No. 809,332, filed Mar. 21, 1969 and entitled "AUTOMATIC PARTICLE COUNTING SYSTEM."

It is here also further stated that the opening 37 of the discharge tube 35 is so tightly sealed by a pressed-on e.g. spring-biased seal member 38 that only fluid medium is discharged; no gas or fluid can be pumped into the system. If desired, the fluid medium ejected through the discharge tube 35 could be again delivered directly back into the supply container 5.

Figure 2:
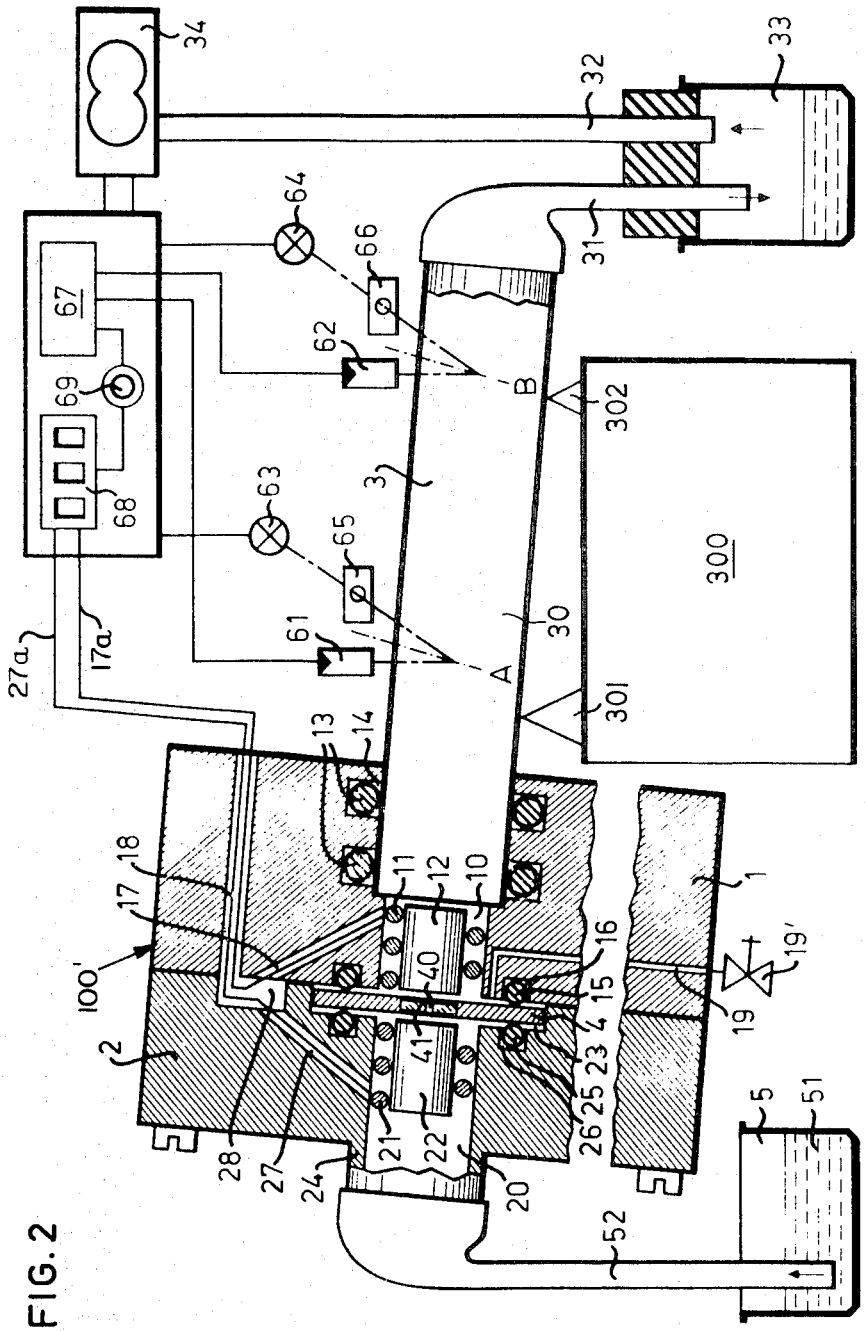
FIG. 2 is a schematic sectional view, partially on an enlarged scale, of a further embodiment of inventive particle counting apparatus, incorporating a mountable electrode-support means and a measuring path support member equipped with a number of resistance measuring paths.

According to a variant form of inventive particle counting apparatus as depicted in FIG. 2, the substantially cylindrically constructed measuring head 100' thereof is designed as a bipartite member composed of the portions 1 and 2. Within the bore 10 of the measuring head portion 1 there is arranged upon a core 12 in substantially spirallike configuration the one electrode member 11. Consequently, the throughflowing fluid medium with the particles suspended therein is forced to partake a spirallike path, the formation of disturbing gas bubbles thus being extensively prevented. Measuring head portion 1 is mounted upon the measuring tube 3 which has a throughflow passage 30 aligned with bore 10 and sealed by means of both sealing rings 13 situated in the recesses or grooves 14.

As to other features of this embodiment, it will be seen that the portion 2 of the measuring head 100' possesses a bore 20 receiving an electrode 21, likewise provided at the inside thereof with a core 22. The measuring head portions 1 and 2 therefore will be understood to constitute the electrode-support means. A groove 23 provided at the body of the measuring head portion 2 serves to receive the measuring path support member or carrier 4. The sealing ring members 15 and 25 arranged in grooves 16 and 26, respectively, seal the crystal, once again a ruby 41 shown oriented in its working position and provided with the resistance measuring path 40, and also seal the corresponding portion of the groove 23 towards the outside. Furthermore, a stud or nipple 24 is machined or otherwise formed at the measuring head portion 2. In the exemplary embodiment illustrated a hose 52, for instance, extends from the stud 24 to the vessel or container 5 storing the fluid 51 which is to be studied. The connecting wires 17a and 27a which are molded or otherwise arranged in the bores 17 and 27, respectively, and connect with the electrodes 11 and 21, respectively, enter a hollow compartment 28 and from this location these wires pass towards the outside through the bore 18. Further, the measuring tube 3, which is removably mounted on supports 301 and 302 of counting apparatus base 300, is operably connected through the agency of hoses 31 and 32 or equivalent structure, via an intermediately disposed collecting vessel 33, with a continuously suction pump unit 34.

Metering of the fluid quantity occurs by means of the electrical-optical system, previously referred to in connection with the embodiment of FIG. 1. The slightly inclined measuring tube 3 is initially filled with a gas, namely air. As soon as the pump unit 34 is placed into operation, fluid is sucked up out of the container 5 through the measuring head 100' into the measuring tube 3. Each bundle of light rays emanating from the associated light source 63 and 64 and passing through the corresponding diaphragm or shutter 65 and 66, respectively, is directed towards the measuring tube 3. The light reflected at its inner wall and outer wall partially impinges upon the associated photoelectric cells 61 and 62, providing the signal transmitters. If the air-fluid boundary or interface passes through the plane or level A, then due to the change in the reflection and refractive conditions at the inner wall of the measuring tube 3, the intensity of the light beam impinging upon the photoelectric cells 61 is also varied. The signal which is thus produced causes, via the action of the signal transmitter 67, switching-in of the pulse counter mechanism 68 which then records all changes in resistance between the electrodes 11 and 12 produced by the particles passing through the resistance measuring path 40. As soon as the air-fluid boundary has passed the plane or level B, the signal generated at the photoelectric cell 62 and appropriately processed at the signal transmitter 67 triggers switching-out of the pulse counter mechanism 68. The volume of fluid medium appearing between the planes A and B within the measuring tube 3 has been exactly determined. Prior to starting a new counting operation, the pulse counter mechanism 68 can be reset to zero by means of the key or button 69.

In the event that a number of measurements should be performed upon a certain fluid medium 51 and the counting results added, then it is sufficient if the measurement volume A-B of the measuring tube 3 is filled with gas prior to performing each individual measuring operation. During renewed passage of a gas-fluid interface or boundary through the planes A and B, the counting operation proceeds in the aforedescribed manner. Emptying of the measuring tube 3 of its fluid contents can be, for instance, undertaken through the use of a gas inlet 19 capable of being closed by a suitable stopcock or valve 19'. Advantageously, this gas inlet 19 opens into the system at a point between the resistance measuring path 40 and the plane A. Upon aerating the system with air, there is thus prevented that the resistance measuring path 40 will become clogged with dust particles or other contaminants which may be present. If different fluids are measured, then, measuring tube 3 is automatically vented via the hose 52 when exchanging the container 5.

Figure 3:
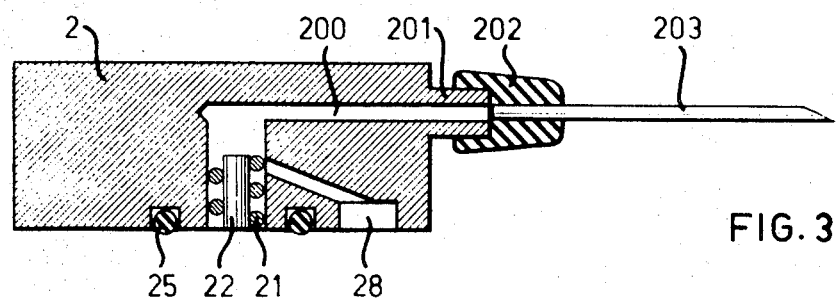
FIG. 3 illustrates in enlarged sectional view a modification of a portion of the measuring head used in the particle counting apparatus of FIG. 2, showing such measuring head portion provided with radially opening infeed means for the fluid medium containing the suspended particles to be counted.

FIG. 3 depicts a further advantageous construction of the portion 2 of a measuring head. Delivery of the fluid medium to be studied occurs laterally through the bore 200 and the stud or nipple 201. Stud 201 can be constructed such that a hollow needle 203 anchored in a coupling piece 202 can be mounted upon such stud. In this manner, it is possible to obtain a sterile measuring sample for instance directly from a container equipped with a pierceable stopper.

Figure 4:
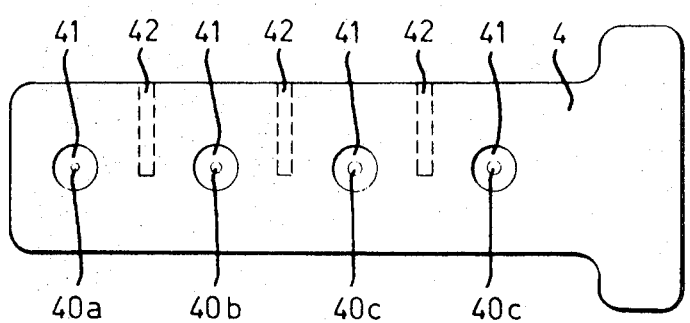
FIG. 4 schematically illustrates on an enlarged scale details of a measuring path support member provided with a number of respective resistance measuring paths and gas inlet grooves which can be used with the inventive particle counting apparatus.

Turning now to FIG. 4, there is schematically depicted therein a measurement path support member 4 provided with four ruby crystals or discs 41 set therein. The corresponding resistance measuring paths 40a, 40b and 40c, provided by the capillaries bored through the associated rubies 41, have different cross-sectional areas, but if desired they could be the same. A vent groove or aeration channel 42 is provided between each two resistance measuring paths. For instance, if the resistance measuring path 40a is situated in its working position and if now the resistance measuring path 40b is displaced into this position, then through the action of the vent groove 42 situated therebetween there occurs venting of the measuring tube 3 (FIG. 2), in that the sealing action of the sealing ring 16 is destroyed. The ventilation grooves 42 can also, for instance, serve as suspension points for locking or fixing spring means which fix the measuring path support 4 in a predetermined position.

Figure 5:
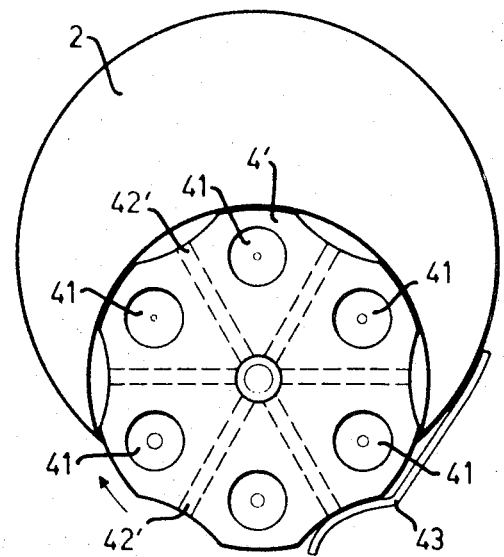
FIG. 5 schematically illustrates a different type of measuring path support member possessing substantially circular arranged resistance measuring paths and gas inlet grooves or channels arranged radially thereat.

In FIG. 5 there is schematically depicted a substantially circular-shaped measuring path support member 4'. Arranged along a circle at such measuring path support member 4' are six rubies 41 which can be selectively rotated in the manner of a turret or revolver into their proper working position. The ventilation grooves 42' are arranged radially between each two ruby crystals or discs 41. A suitable retaining spring member 43 fixedly holds the measuring path support member 4' in its different working positions. For purposes of fabricating the components 1 and 2 of the measuring head, materials such as plastic, for instance epoxy resins and Teflon, ceramics, glass, and the like have been found to be particularly suitable. The measuring path support member can be formed of ceramics, glass or a suitable plastic. What has been found to be particularly suitable for the resistance measuring path are capillaries bored in crystals such as sapphire, ruby or quartz.

It should be apparent from the foregoing detailed description, that the objects set forth at the outset to the specification have been successfully achieved.

What is claimed is:

1. In a counting apparatus for counting particles suspended in a fluid medium, the electrical conductivity of which is different from that of the particles, comprising measuring tube means for confining a quantity of the fluid medium containing the particles, a measuring head detachably supported at one open end of said measuring tube means so as to enclose said open end, said measuring head comprising electrode-support means mounted in sealing fashion at the region of said one end of said measuring tube means and a measuring path support member possessing means providing at least one predetermined electrical resistance measuring path, a pair of electrodes supported entirely by said electrode-support means, connecting wire means extending from said pair of electrodes and penetrating through said electrode-support means whereby the electrodes and their connecting wire means are unitary with the detachable head and removable as a unit therewith, said measuring path support member being detachably mounted at said electrode-support means for replacement by another measuring path support means.

2. In a counting apparatus for counting particles suspended in a fluid medium, the electrical conductivity of which is different from that of the particles, comprising measuring tube means for the fluid medium containing the particles, a measuring head mounted at one open end region of said measuring tube means and encircling said one open end region, said measuring head incorporating electrode-support means mounted at said one open end region of said measuring tube means and a measuring path support member possessing means providing at least one predetermined electrical resistance measuring path, said means providing said electrical resistance measuring path defining at least one throughflow passageway for the fluid medium from one side to the opposite side thereof, a pair of electrodes carried entirely by said electrode-support means and mounted substantially at opposite sides of said electrical resistance measuring path, connecting wire means extending from said pair of electrodes and penetrating through said electrode-support means, said measuring tube means whereby the electrodes and their connecting wire means are unitary with the measuring head and removable as a unit therewith, said electrode-support means and said measuring path support member comprising separate elements, said measuring path support member being detachably insertably mounted at said electorde-support means.

3. A counting apparatus as defined in claim 2, further including supply means for the fluid medium containing the suspended particles, means for conveying the fluid medium with the suspended particles from said supply means through said electrical resistance measuring path into said measuring tube means, and means for controlling the quantity of fluid medium received in said measuring tube means.

4. A counting apparatus as defined in claim 3, wherein said controlling means incorporates a volume metering device and mechanism responsive to said volume metering device for controlling operation of said conveying means.

5. A counting apparatus as defined in claim 2, wherein said measuring path support member is provided with a number of electrical resistance measuring paths each of which can be selectively brought into its operable position by appropriate displacement of said measuring path support member.

6. An apparatus for counting particles suspended in a fluid medium, the electrical conductivity of which is different than that of the particles, comprising supply means for the fluid medium containing the suspended particles, measuring tube means having one open end communicating with said supply means for receiving fluid medium from said supply means, measuring head means detachably carried by said one open end of said measuring tube means, said measuring head means incorporating electrode-support means mounted at said measuring tube means and a measuring path support member possessing means providing at least one predetermined electrical resistance measuring path, said electrical resistance measuring path means forming at least one throughflow passageway for the transfer of said fluid medium from one side to the opposite side thereof and in the direction of said one open end of said measuring tube means, a pair of electrodes supported entirely by said electrode-support means, each of said pair of electrodes being mounted at said electrode-support means for cooperation with one given side of said electrical resistance measuring path means for monitoring the particles suspended in the fluid medium which flow through said passageway thereof, connecting wire means extending from said pair of electrodes and penetrating through said electrode-supporrt means whereby the electrodes and their connecting wire means are unitary with the detachable head and removable as a unit therewith, said measuring path support member being removably mounted at said electrode-support means of said measuring head means, said measuring tube means, said electrode-support means and said measuring path support member comprising separate interfitting elements, conveying means for delivering fluid medium together with the suspended particles from said supply means through said throughflow passageway of said electrical resistance measuring path into said measuring tube means, whereby each particle upon passing through said electrical resistance measuring path causes a change in the resistance of said measuring path which is dependent upon the size of the particles, and volume metering means for controlling the quantity of fluid medium passing into said measuring tube means.

7. An apparatus for counting particles as defined in claim 6, wherein said measuring path support member possesses means providing a plurality of electrical resistance measuring paths which can be selectively brought into their respective working position through displacement of said measuring path support member.

8. An apparatus for counting particles as defined in claim 7, wherein said plurality of electrical resistance measuring paths are the same size.

9. An apparatus for counting particles as defined in claim 7, wherein said plurality of electrical resistance measuring paths are different in size from one another.

10. An apparatus for counting particles suspended in a fluid medium, the electrical conductivity of which is different than that of the particles, comprising supply means for the fluid medium containing the suspended particles, measuring tube means having one open end communicating with said supply means for receiving fluid medium from said supply means, measuring head means detachably carried by said one open end of said measuring tube means, said measuring head means incorporating electrode-support means mounted at said measuring tube means and a measuring path support member possessing means provided at least one predetermined electrical resistance measuring path, said means providing said electrical resistance measuring path forming at least one throughflow passageway for the transfer of said fluid medium from one side to the opposite side thereof and in the direction of said one open end of said measuring tube means, a pair of electrodes supported by said electrode-support means, each of said pair of electrodes being mounted at said electrode-support means for cooperation with one given side of said electrical resistance measuring path means for monitoring the particles suspended in the fluid medium which flow through said passageway thereof, said measuring path support member being removably mounted at said electrode-support means of said measuring head means, conveying means for delivering fluid medium together with the suspended particles from said supply means through said throughflow passageway of said electrical resistance measuring path into said measuring tube means, whereby each particle upon passing through said electrical resistance measuring path causes a change in the resistance of said measuring path which is dependent upon the size of the particles, and volume metering means for controlling the quantity of fluid medium passing into said measuring tube means, and at least one gas inlet means disposed between said electrical resistance measuring path and said volume metering means.

11. An apparatus for counting particles as defined in claim 10, wherein said at least one gas inlet means is provided at said measuring path support member.

12. An apparatus for counting particles as defined in claim 6, wherein said volume metering means incorporates an optical-electrical volume metering device.

13. An apparatus for counting particles as defined in claim 12, wherein said conveying means for said fluid medium containing the suspended particles is constructed to operate continuously in one direction.

14. An apparatus for counting particles as defined in claim 6, wherein said electrode-support means and said measuring path support member are formed of a substantially rubber-elastic chemically inert material.

15. An apparatus for counting particles as defined in claim 6, wherein said means providing said at least one predetermined electrical resistance measuring path embodies a crystal member equipped with a calibrated bore defining said throughflow passageway and which is mounted at said measuring path support member.

16. An apparatus for counting particles as defined in claim 6, further including a number of separate measuring path support members which can be detachably and removably mounted at said electrode-support means and each of which is provided with means providing at least one electrical resistance measuring path.